United States Patent [19]

Chung et al.

[11] Patent Number: 5,086,503
[45] Date of Patent: Feb. 4, 1992

[54] METHODS OF REMAPPING A KEYBOARD WITHIN A COMPUTER SYSTEM

[75] Inventors: Connie Y. Chung; Robert G. Keen; Ozella Raymond; Jan W. Snyder, all of Austin; Dennis A. Tohlen, Round Rock, all of Tex.

[73] Assignee: International Business Machines Corporation, Armonk, N.Y.

[21] Appl. No.: 179,177

[22] Filed: Apr. 8, 1988

[51] Int. Cl.⁵ .............................................. G06F 3/02
[52] U.S. Cl. .................................. 395/700; 364/928; 364/927.2; 364/DIG. 2
[58] Field of Search ... 364/200 MS File, 900 MS File; 340/490; 341/20-28

[56] References Cited

U.S. PATENT DOCUMENTS

| | | | |
|---|---|---|---|
| 4,202,041 | 5/1980 | Kaplow et al. | 364/900 |
| 4,524,244 | 6/1985 | Faggin et al. | 379/93 |
| 4,527,250 | 7/1985 | Galdun et al. | 364/900 |
| 4,688,020 | 8/1987 | Kuehneman et al. | 340/365 |
| 4,906,117 | 3/1990 | Birdwell | 400/490 |

FOREIGN PATENT DOCUMENTS 0246021 11/1987 European Pat. Off.
160225  1/1985 Japan.

Primary Examiner—Thomas C. Lee
Assistant Examiner—Robert B. Harrell
Attorney, Agent, or Firm—H. St. Julian; Casimer K. Salys; Douglas H. Lefeve

[57] ABSTRACT

This invention relates to remapping of keyboards within a computer system in a user friendly manner. A plurality of terminal emulators, which are included in the computer system, may require different keyboard inputs. A keyboard program is activated to display one of a plurality of keyboard layouts to be remapped for a selected emulator. A plurality of definitions are displayed in response to the selection of a key the displayed keyboard layout. An action is then selected to modify one or more definitions of the selected key. Thereafter, a plurality of keys and their respective definitions may be simultaneously displayed.

18 Claims, 5 Drawing Sheets

FIG. 9

```
         SELECT PROFILE NAME              MORE: ∧ ∨

NAMES      COMMENTS
──────     ────────
> xxxxxxx   xxxxxxxxxxxxxxxxxxxx xxxxxxxxxxxxxxxxxxxx
■ xxxxxxx   xxxxxxxxxxxxxxxxxxxx xxxxxxxxxxxxxxxxxxxx
■ xxxxxxx   xxxxxxxxxxxxxxxxxxxx xxxxxxxxxxxxxxxxxxxx
■ xxxxxxx   xxxxxxxxxxxxxxxxxxxx xxxxxxxxxxxxxxxxxxxx
■ xxxxxxx   xxxxxxxxxxxxxxxxxxxx xxxxxxxxxxxxxxxxxxxx
■ xxxxxxx   xxxxxxxxxxxxxxxxxxxx xxxxxxxxxxxxxxxxxxxx
■ xxxxxxx   xxxxxxxxxxxxxxxxxxxx xxxxxxxxxxxxxxxxxxxx
■ xxxxxxx   xxxxxxxxxxxxxxxxxxxx xxxxxxxxxxxxxxxxxxxx
■ xxxxxxx   xxxxxxxxxxxxxxxxxxxx xxxxxxxxxxxxxxxxxxxx
■ xxxxxxx   xxxxxxxxxxxxxxxxxxxx xxxxxxxxxxxxxxxxxxxx

ESC = CANCEL    F1 = HELP
```

FIG. 12

```
    CURRENT SELECTION

BASE . . . : xxxxxxxxxxxxxxxxxxxx
SHIFT . . . : xxxxxxxxxxxxxxxxxxxx
ALT GR . . . : xxxxxxxxxxxxxxxxxxxx
CTRL . . . : xxxxxxxxxxxxxxxxxxxx
ALT . . . : xxxxxxxxxxxxxxxxxxxx
```

FIG. 13

```
     PRIOR SELECTION

BASE . . . : xxxxxxxxxxxxxxxxxxxx
SHIFT . . . : xxxxxxxxxxxxxxxxxxxx
ALT GR . . . : xxxxxxxxxxxxxxxxxxxx
CTRL . . . : xxxxxxxxxxxxxxxxxxxx
ALT . . . : xxxxxxxxxxxxxxxxxxxx
```

```
                EDIT KEY ACTIONS
     BASE . . . [                              >
     SHIFT  . . [                              >
     ALT GR . . [                              >
     CTRL . . . [                              >
     ALT  . . . [                              >

ENTER ESC-CANCEL  F1-HELP  F4-LIST
```
FIG. 15

```
> 1. SWAP          FIG. 16
ESC-CANCEL
```

```
                          > 1. DESELECT KEYS
              FIG. 17
                          ESC-CANCEL
```

```
> 1. DISPLAY KEYBOARD
ESC-CANCEL
```
FIG. 18

```
                 EXIT OPERATIONS
           > 1. SAVE THEN EXIT
           ■ 2. SAVE THEN RESUME
           ■ 3. EXIT WITHOUT SAVING

FIG. 14   ESC-CANCEL  F1-HELP
```

```
       AT KEYBOARD - CONTROL SECTION, LOWER KEYS

| PF15 | PF16  |   | 4     | 5    | 6     | -    |
   | PF5  | PF6   |   | LEFT  |      | RIGHT | PA2  |
   |      | EREOF |   | FAST L|      | FAST R| REVID|

| PF17 | PF18  |   | 1     | 2    | 3     |      |
   | PF7  | PF8   |   |       | DOWN | PA3   | ENTER|
   | PRINT|       |   | BLINK | UNDSC| >>HI  |      |
   | IDENT| TEST  |   |       |      |       |      |

| PF19 | PF20  |   | 0           |              |
   | PF9  | PF10  |   | INS         | DEL          |
   |      | RESET |   |             |              |
   |      | DVCNL |   |             |              |

ESC-CANCEL  F1-HELP  F7-BACKWARD  F8-FORWARD
```
FIG. 19

METHODS OF REMAPPING A KEYBOARD WITHIN A COMPUTER SYSTEM

TECHNICAL FIELD

This invention relates generally to remapping a keyboard, and more particularly to methods of remapping a keyboard across terminal emulation functions in a computer system in an accurate and user friendly manner.

BACKGROUND INFORMATION

With the increase in personal computer users and the increase in complexity of software programs, the programs need to compensate for the less sophisticated users. One of the major problems facing personal computer users is the keyboard layout. The placement of graphic keys and function keys varies greatly from program to program. The ability to move the key definitions gives the user a way to lessen the confusion when executing different programs.

The typical way of changing the definition of keys is through a file built by the user. That file has the syntactical statements that modify keys. The syntax of those statements varies from program to program. The set of keys that can be moved also may vary from product to product. Some of these files modify the keyboard layout used by the operating system. Some modify the keyboard layout used within a program. In some cases, both kinds of redefinition can be active simultaneously causing compound redefinition. It is very difficult for the less sophisticated user to understand how and when these redefinitions occur.

Consequently, a user friendly technique is needed which facilitates the changing of the users' keyboard layouts. This technique should be easily understandable. It should lessen the confusion between different physical keyboards, different functions, different graphics keys and different native keyboard layouts. It should allow a user to modify all keyboard layouts encountered in a complex product with a common key definition facility.

DISCLOSURE OF THE INVENTION

A method of remapping a keyboard within a computer system in a user friendly manner. An end user activates the keyboard remap program and then selects the type of keyboard layout to be remapped. The user is then prompted to select one of a plurality of operations to be performed on the selected keyboard. The operations include create a new keyboard, and change, display or delete an existing keyboard. If the selected operation is create or change, the user is presented with a display of a layout of the selected keyboard. Thereafter, the user selects one or more keys to be remapped and selects an action to be performed on the selected key or keys. The available actions include swap, edit, deselect, display or exit. In order to change one or more of the definitions for a selected key, the user selects either the edit or the swap action. The definitions associated with the selected key may be a single character, a string of characters, or a function. The user may then simultaneously view the definitions of a plurality of keys within a selected one of a plurality of sections of the selected keyboard. After the user has performed the desired actions on the selected keyboard, the user may store the modified keyboard and exit the remap program or perform other operations which are available in the remap program.

BRIEF DESCRIPTION OF THE DRAWING

FIGS. 3 through 19 are display screens which are employed by the users of the computer system in remapping one or more keyboards associated with emulators installed in the computer system.

BEST MODE FOR CARRYING OUT THE INVENTION

Figure 1:
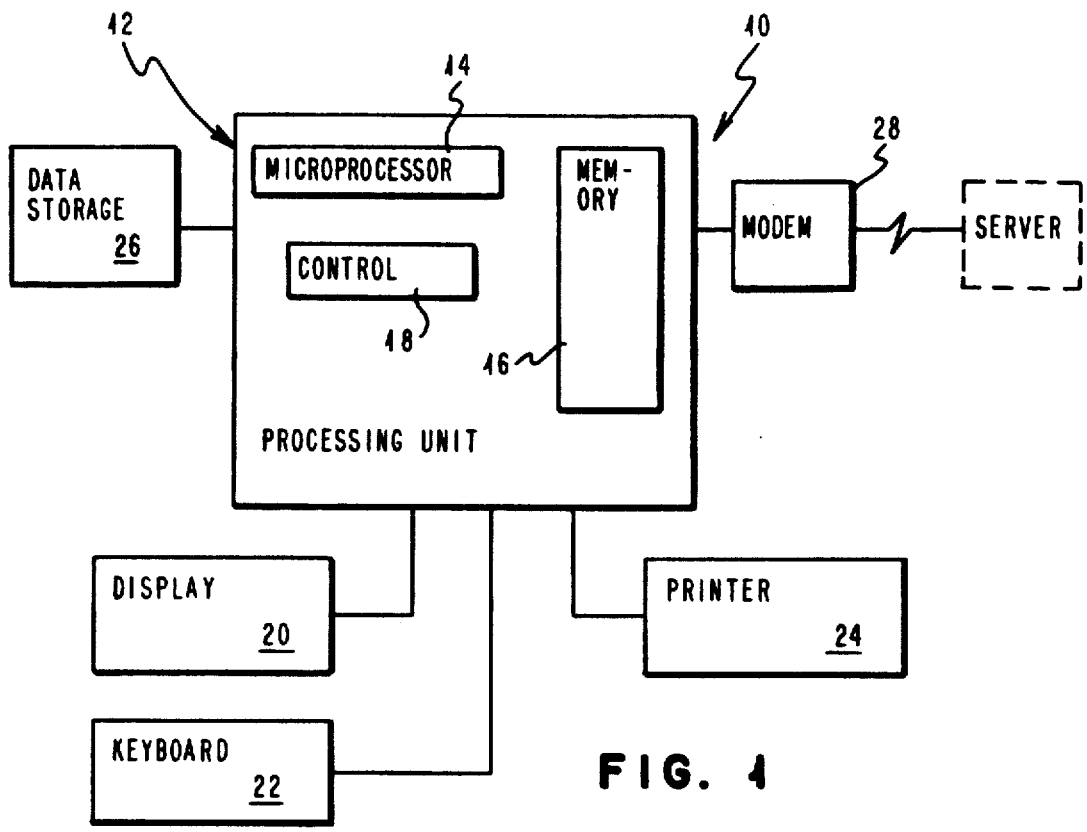
FIG. 1 is a block diagram of a computer system on which the method of the present invention may be employed.

Referring to FIG. 1, there is shown a computer system 10 on which the present invention may be employed. System 10 includes a central processing unit 12 having a microprocessor 14, a memory system 16 and a control system 18 which functions to control input/output operations in addition to the interaction between the microprocessor and the memory system. System 10 also includes a group of conventional peripheral units including a display device 20, a keyboard 22, a printer 24, a data storage unit 26 and a communication adapter, such as a modem 28. Since the details of the above described functional systems form no part of the present invention and can be found in the prior art, only a brief functional description of each of the systems will be set forth.

The central processing unit 12 corresponds to the "system unit" of a personal computer system such as the IBM XT or the IBM AT or the IBM Personal Systems/2 computer systems. The central processing unit 12 is provided with a multitasking operating system program such as the IBM Operating System/2 which is normally employed to run the systems. The operating system program is stored in memory system 16 along with one or more application programs that the user has selected to run. Depending on the capacity of the memory system 16 and the size of the application programs, portions of these programs, as needed, may be transferred to the memory system 16 from the data storage unit 26 which may include, for example, a hard disk drive and a diskette drive. The basic function of the data storage unit 26 is to store programs and data which are employed by the system 10 and which may readily be transferred to the memory system 16 when needed. The function of the diskette drive is to provide a removable storage function for entering programs and data into the system, and a vehicle for storing data in a form that is readily transportable for use on other computer systems.

Display device 20 and keyboard 22 together provide for an interactive operation of the computer system 10 wherein the interpretation that the computer system gives to a specific keystroke by the user depends, in substantially all situations, on what is being displayed to the user at that point in time.

In certain situations, the user, by entering commands into the computer system 10, causes the system to perform a certain function. In other situations, the computer system 10 requests the entry of certain data, generally by displaying a prompt type of menu/message screen. The depth of the interaction between the user and the computer system 10 varies by the type of operating system and the application program, but is a necessary characteristic of the computer systems on which the method of the present invention may be employed.

As noted above, computer system 10 includes the printer 24 which functions to provide a hard copy output of data developed or stored in the computer system. The modem 28 functions to transfer data from the computer system 10 to a remote host system or server system through one or more communication links which may be a commercial type link or a dedicated communications link.

System 10 includes a function program stored in the memory system 16 thereof which enables the system to remap the keyboard 22 which enables the system 10 to emulate a plurality of different types of terminals.

An end user of system 10, after activating the keyboard function program, may change the action or definition of any shift state of any key except selected keys which are not modifiable. The "not modifiable" keys are identified in the profile of the keyboard and include such keys as a system hot key and the shift keys. The shift state of a selected key indicates either the base, uppercase, control, alternate, or alternate-graphics state thereof. The user may exchange or swap the actions or definitions of two selected keys. Strings of keystrokes may be assigned to any shift state of a selected key. The user may remove all of the actions or definitions of a selected key so that subsequent depression of the key will result in no action to be taken by the system 10. The key actions or definitions which have been removed from a profile may be restored by the user subsequent to the activation of the keyboard function program. The keyboard function program allows the user to make a customized profile for all of the operating system emulators' keyboards irrespective of whether the user is using that particular keyboard.

Set out below is an illustration of the keyboard function program for remapping the keyboard 22 for a plurality of terminal emulation functions, hereinafter emulators, installed on system 10. The result of remapping the keyboard 22 is a keyboard profile which is a set of tables. The tables define the actions of all of the keys on a selected emulators' keyboard. The format of the tables is common to all of the emulators. The keyboard function program is in program design language from which source code and machine code are derivable. In the following general description of the keyboard function program, it is to be assumed that system 10 is under mouse and keyboard device control. Moreover, it is assumed that the keyboard function program is invoked from a driver program contained in the operating system which facilitates the display of all of the screen panels and the monitoring of the keyboard 22. Additionally, it is assumed that the operating system includes a plurality of emulators as an integral part thereof.

```
RKBMAIN MAIN PROC
    DISPLAY "CONFIGURATION FILE POP UP" TO PROMPT FOR
    CONFIGURATION FILE
    OPEN CONFIGURATION FILE BY CALLING PROFILE SERVICE
    IF PROFILE_SERVICE_RC IS OK
        DISPLAY "SELECT EMULATOR POP UP" FOR EMULATOR
            SELECTION
        DISPLAY "SELECT KEYBOARD POP UP" FOR KEYBOARD
            SELECTION
        ASSIGN PROFILE TYPE BASED ON SELECTED EMULATOR AND
            KEYBOARD
        CALL RKBOPRT (PROFILE OPERATION)
        CLOSE CONFIGURATION FILE BY CALLING PROFILE
            SERVICE
        IF REMAP_RC IS NOT FATAL ERROR
            IF PROFILE_SERVICE_RC IS NOT OK
                REMAP_RC = FATAL ERROR
            ENDIF
        ENDIF
    ENDIF
    IF REMAP_RC = FATAL ERROR
        LOG ERROR BY CALLING SYSTEM LOG SERVICE
    ENDIF
    RETURN TO MAIN TASK
ENDPROC RKBMAIN MAIN PROC
```

The RKBMAIN module is called when the user activates the keyboard function program. The user is prompted to select one of a plurality of emulators, and one type of a plurality of physical keyboards to perform the keyboard remap function. The RKBMAIN module initializes the dialog with the user by displaying a configuration pop-up panel on the display 20. System 10, in response to the RKBMAIN module will display a default configuration file name which is the active configuration file. The user may enter a different file name if desired. As noted above, the user is prompted to select the emulator to be used with the remapped keyboard and the physical keyboard. For purposes of illustration and not limitation, the user may select from the following emulators and physical keyboards, respectively: the IBM 3101 terminal emulator, the IBM 3270 terminal emulator, or the VT100 terminal emulator, the IBM AT keyboard, the IBM Enhanced 101 keyboard, or the IBM Enhanced 102 keyboard. The RKBMAIN module then call the RKBOPRT module.

```
RKBOPRT MAIN PROC
    DISPLAY "PROFILE OPERATION" POP UP TO SELECT
        OPERATION
    IF OPERATION IS CREATE
        CALL SPECIFY_MODEL_NEW PROFILE TO SPECIFY MODEL
            AND NEW PROFILE NAMES
    ELSE
```

```
        IF OPERATION IS DISPLAY, CHANGE OR DELETE
            CALL SPECIFY_PROFILE TO SPECIFY PROFILE NAME
        ENDIF
    ENDIF ENDPROC RKBOPRT MAIN PROC
SPECIFY_MODEL_NEW PROFILE PROC
    DISPLAY "SPECIFY MODEL/NEW PROFILE NAME" POP UP
    IF CURSOR IS ON MODEL NAME FIELD AND F4 IS PRESSED
        (F4 = LIST)
        DISPLAY "SELECT PROFILE NAME" POP UP TO PROVIDE A
        LIST OF PROFILE NAMES AND ALLOW USER TO SELECT
        FROM
    ENDIF
    VALIDATE BOTH MODEL AND NEW PROFILE NAME
    SET CURSOR TO MODEL NAME FIELD
    DISPLAY COMMENT TEXT POP UP
    READ PROFILE INTO REMAP WORKING AREA BY CALLING
    PROFILE SERVICE
    CALL RKBACTS (A MODULE TO PERFORM ALL REMAP ACTIONS)
ENDPROC SPECIFY_MODEL_NEW_PROFILE
SPECIFY_PROFILE PROC
    DISPLAY "SPECIFY PROFILE NAME" POP UP
    IF F4 IS PRESSED (F4 = LIST)
        DISPLAY "SELECT PROFILE NAME" POP UP TO PROVIDE A
        LIST OF PROFILE NAMES AND ALLOW USER TO SELECT
        FROM
    ENDIF
    VALIDATE PROFILE NAME
    DISPLAY "SPECIFY COMMENT TEXT" POP UP
    CASE ENTRY (SELECTED OPERATION)
        CASE (DISPLAY)
            READ PROFILE INTO REMAP WORKING AREA BY CALLING
            PROFILE SERVICE
            SET FLAG INDICATES THAT DISPLAY IS FROM
            OPERATION POP UP
            CALL RKBVIEW (A MODULE TO DISPLAY 7 SECTIONS OF
            KEYBOARD LAYOUT)
        CASE (CHANGE)
            READ PROFILE INTO REMAP WORKING AREA BY CALLING
            PROFILE SERVICE
            CALL RKBACTS (A MODULE TO PERFORM ALL REMAP
            ACTIONS)
        CASE (DELETE)
            DELETE THE USER SPECIFIED PROFILE BY CALLING
            PROFILE SERVICE
    ENDCASE
ENDPROC SPECIFY_PROFILE
```

The RKBOPRT module process the profile operations. The user selects, in response to a pop-up panel displayed on the display 20, one of a plurality of operations to be performed. The operations include display an existing keyboard profile, change an existing keyboard profile, create a new keyboard profile or delete an existing profile. If the user selects the display, change or delete operations, the system 20 prompts the user to enter an existing profile name. If the create operation is selected, a SPECIFY_MODEL_NEW_PROFILE subroutine is called by the RKBOPRT module which prompts the user to enter an existing profile name which will be the starting layout or model profile for the new profile and a new profile name under which the resulting or newly created profile will be saved. System 20 includes a list of default or available model profile names stored in memory 16 and will display the list to the user in response to the user's request. The list of model profile names displayed are the only names relevant to the emulator, physical keyboard and profile operation previously selected by the user. Thereafter, the user is prompted to enter any comments to be stored with the new profile name. Subsequently, the SPECIFY_MODEL_NEW_PROFILE subroutine calls a RKBACTS module to perform the keyboard remap actions.

```
RKBACTS MAIN PROC
    ESTABLISH A KEY POSITION AND SCAN CODE MAPPING TABLE
    FOR AT/101/102 KB
    SET POINTER TO XLAT TABLE IN PROFILE
    MOVE STRING POINTER TABLE FROM PROFILE TO REMAP
    WORKING AREA
    SET POINTER TO STRING POINTER TABLE
    MOVE STRING TABLE FROM PROFILE TO REMAP WORKING AREA
    SET POINTER TO STRING TABLE
    SET NUMBER OF STRING ENTRY
    SET INITIAL KEY SELECTION FLAG = ON
    DISPLAY "REMAP ACTION" PANEL TO ALLOW USER SELECT
    KEYS, THEN SELECT ACTIONS
    IF IT IS IN APPLICATION ACTION BAR
        CASE ENTRY (ACTION)
            CASE (SWAP IS SELECTED)
```

```
                CALL RKBSWAP
            CASE (EDIT IS SELECTED)
                CALL RKBREMAP
            CASE (DESELECT IS SELECTED)
                CALL RKBDSLT (A MODULE TO DISMISS THE
                CURRENT/PRIOR KEY DEFINITION POP UPS)
            CASE (DISPLAY IS SELECTED)
                SET FLAG TO INDICATE THAT DISPLAY IS FROM
                ACTION PANEL
                CALL RKBVIEW (A MODULE TO DISPLAY 7 SECTIONS
                OF KEYBOARD LAYOUT)
            CASE (SWAP IS SELECTED)
                CALL RKBENDS (A MODULE TO END THE KEYBOARD
                REMAP)
        ENDCASE
    ELSE (IT IS NOT IN APPLICATION ACTION BAR)
        IF ENTER KEY IS PRESSED
            SET POINTER TO SCAN CODE TABLE
            SET MAX NUMBER OF SCAN CODE ENTRIES
            USE SELECTED KEY POSITION TO BE INDEX AND FIND
            THE CORRESPONDING SCAN CODE IN THE SCAN CODE
            TABLE
            PRIOR SCAN CODE = SCAN CODE
            SCAN CODE = MATCHED SCAN CODE IN SCAN CODE TABLE
            CALL RKBREPLAY TO REPLAY THE SELECTED KEY
        ELSE
            IF ESCAPE KEY IS PRESSED
                CALL RKBENDS
            ENDIF
        ENDIF
    ENDIF ENDPROC RKBACTS MAIN PROC
```

Figure 11:
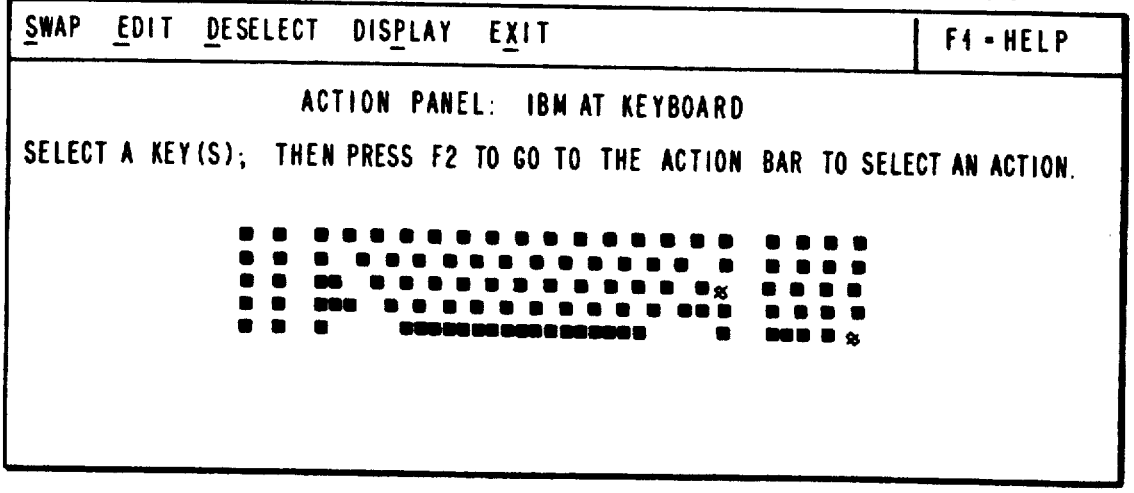

The RKBACTS module facilitates the display of an action panel or a keyboard layout which is a diagram of the selected type of physical keyboard. FIG. 11 shows an example of an action panel or keyboard layout for the IBM AT Keyboard. It is to be understood that other types of keyboards may be displayed in this manner. The RKBACTS module facilitates the establishment of a key position and scan code mapping table and the setting of pointers to the respective ASCII, function name, translate and string tables for the selected physical keyboard, emulator and keyboard profile. Each action panel includes a plurality of blots which represents the position of each of the respective keys on the selected physical keyboard. The user is then prompted to select a key or key position on the action panel. Selection of a key is by moving a cursor coincident therewith through the use of cursor keys on keyboard 22 (FIG. 1) or through the use of a point device such as a mouse. When a key is selected, the selected key is highlighted on the diagram of the keyboard in the action panel. Moreover, a first pop-up panel is displayed which sets forth all of the current key definitions for the selected key. Since this profile is based upon an existing profile, there may be existing definitions for one or more of the keys represented by the blots.

If the user wants to modify one or all of the selected key's definition, the user then selects an edit function from an action bar appearing in the action panel. System 10 will then display an edit pop-up panel which lists the existing assignments or definitions for the selected key. The user then may enter a new definition or change one or more of the existing definitions for the selected key. The new definition may be a single character, a string of characters, a function, or a combination of a string and a function. Moreover, the user may request system 10 to display a list of functions for the selected emulator and select one of the functions listed therein. As noted above, in the preferred embodiment of the invention, each key may have as many as five possible definitions or actions. Thereafter, if a second key is selected in the manner set forth above, a second pop-up panel is displayed adjacent to the first pop-up panel. These two pop-up panels enables the user to simultaneously view the definitions of two different keys. The user may select a swap action which facilitates the exchange of all of the assignments of the two keys. The user may continue to select keys and edit or swap their respective definitions. After all of the editing and swapping have been completed, the user may select a display action or exit function.

If the display action is selected, the RKBACTS module call a RKBVIEW module which facilitates the display of a plurality of keyboard panels having a plurality of cells and enables the user to view a running account of the changes being made. The cells in the keyboard panels are representations of each key position on the selected physical keyboard. Each of the respective cells include all of the definitions of the shift states associated with the respective keys. The definitions associated with the respective keys are filled in from the actual keyboard tables as they are being changed. Due to the size of the screen on the display 20, the selected keyboard is separated into sections. One keyboard panel is associated with an associated section of the selected physical keyboard. The keyboard panels are displayed in a rotating manner. The first keyboard panel to be displayed will be the section which included the last key selected and simultaneously displays all of the keys in that section and their respective definitions. When the user completes the display of the different keyboard panels, system 10 re-displays the action panel. The user may then continue to select keys and perform the edit action or swap action thereon.

If the user selects the exit function, system 10 displays an exit operations pop-up panel. The user enters whether the profile should be saved prior to exit, exit without saving the profile, save then resume other profile operations or resume without saving the profile.

If the user selected the change, display or delete operations above, a SPECIFY_PROFILE subroutine is called by the RKBOPRT module and which facilitates the display of a pop-up panel prompting the user to enter the existing keyboard profile name. The change operation enables the user..to change the definitions associated with one or more of the keys associated with the existing keyboard profile name. The user is then presented with an action panel which is a diagram of the previously selected physical keyboard. The user selects and edits the keys in the same manner noted above for the create operation. After all of the changes have been made, the user either selects the display operation or the exit operation.

Upon the selection of the display operation, the user is prompted to enter an existing keyboard profile name. The SPECIFY_PROFILE subroutine then reads the keyboard profile into a working area of memory 16. Thereafter a RKBVIEW module is called to facilitate the display of the selected keyboard. The keyboard panels are then displayed to show all of the keys with a section of the selected keyboard and all of the definitions for the respective keys. The subsequent keyboard panel or the previous keyboard panel will be displayed in a rotating manner in response to the user activating an associated function key on the keyboard 22.

The selection of the change operation also prompts the user to enter an existing keyboard profile name. The SPECIFY_PROFILE subroutine then reads the keyboard profile into a working area of memory 16. Thereafter the RKBACTS module is called to perform all remap actions.

The selection of the delete operation also prompts the user to enter an existing keyboard profile name. After the profile name is entered, system 10 delete operation. Thereafter, if the user confirms the selection of the delete operation, the system 10 deletes the existing keyboard profile from the memory system 16.

```
RKBVIEW MAIN PROC
ESTABLISH A SCAN CODE AND PANEL INDEX MAPPING TABLE
(AT/101/102)
CALL FILL_UP_DISPLAY TABLE
IF SELECTED KEYBOARD IS AT
    DEFINE ALL KEY CELL ARRAYS FOR AT KEYBOARD
    SET LAST_PANEL = 6
    CALL DISPLAY_LAYOUT
ELSE
    IF SELECTED KEYBOARD IS 101
        DEFINE ALL KEY CELL ARRAYS FOR 101 KEYBOARD
        SET LAST_PANEL = 7
        CALL DISPLAY_LAYOUT
    ELSE
        DEFINE ALL KEY CELL ARRAYS FOR 102 KEYBOARD
        SET LAST_PANEL = 7
        CALL DISPLAY_LAYOUT
    ENDIF
ENDIF ENDPROC RKBVIEW
FILL_UP_DISPLAY_TABLE PROC
INITIALIZE DISPLAY TABLE (128 * 5 * 6)
SET CONVERT DIRECTION FLAG = REPLY
IF (DISPLAY IS FROM OPERATION)
    SET POINTER TO XLAT TABLE IN PROFILE
ENDIF
SCAN CODE INDEX = 1
DO WHILE (SCAN CODE INDEX <= 128) AND (REMAP_RC IS
    OK)
    SHIFT INDEX = 1
    DO WHILE (SHIFT INDEX <= 5) AND (REMAP_RC IS OK)
        SET POINTER TO CURRENT ENTRY OF XLAT TABLE
        IF IT IS NOT A DEAD KEY
            IF IT IS A SINGLE CHARACTER KEY
                SAVE KEY DEFINITION IN EMULATOR FORMAT
                (TYPE, VALUE, XLAT OPERATION)
                CALL RKBASCPM TO CONVERT KEY DEFINITION FROM
                EMULATOR FORMAT TO A DISPLAYABLE SINGLE
                CHARACTER
                IF CONVERT_RC IS NOT OK
                    REMAP_RC = FATAL ERROR
                ELSE
                    CURRENT DISPLAY TABLE ENTRY = DISPLAYABLE
                    ASCII SINGLE CHARACTER
                ENDIF
            ELSE
                IF IT IS A FUNCTION KEY
                    SAVE KEY DEFINITION IN EMULATOR FORMAT
                    CALL RKBFNCPM TO CONVERT KEY DEFINITION
                    FROM EMULATOR FORMAT TO A DISPLAYABLE
                    FUNCTION NAME
                    IF CONVERT_RC IS NOT OK
                        REMAP_RC = FATAL ERROR
                    ELSE
                        CURRENT DISPLAY TABLE
                        ENTRY = DISPLAYABLE FUNCTION NAME
                    ENDIF
                ELSE
                    IF IT IS A STRING KEY
                        CURRENT DISPLAY TABLE ENTRY = "PLBK"
                    ENDIF
```

```
            ENDIF
          ENDIF
        ENDIF
        INCREASE SHIFT INDEX BY 1
    ENDDO
    INCREASE SCAN CODE INDEX BY 1
ENDDO ENDPROC FILL_UP_DISPLAY_TABLE
```

The RKBVIEW module, which is called by the RKBOPRT and the RKBACTS modules, facilitates the display of a layout for the current keyboard. A scan code and panel index mapping table will be generated. The RBKVIEW module then calls FILL_UP_DISPLAY_TABLE and DISPLAY_LAYOUT subroutines to facilitate the display of a series of view or keyboard panels. The keyboard panels each includes the plurality of cells wherein each of the cells includes the representations of all of shift states for each key in the keyboard.

```
DISPLAY_LAYOUT PROC
    IF (DISPLAY IS FROM OPERATION SELECTION)
        INITIALIZE PANEL INDEX = 1
    ELSE (DISPLAY IS FROM APPLICATION ACTION BAR)
        IF (SCAN CODE = 0)
            INITIALIZE PANEL INDEX = 1
        ELSE
            IF (SELECTED KEYBOARD = AT)
                PANEL INDEX = SCAN CODE -> AT_PANEL_INDEX
            ELSE
                IF (SELECTED KEYBOARD = 101)
                    PANEL INDEX = SCAN CODE -> 101_PANEL_INDEX
                ELSE (SELECTED KEYBOARD = 102)
                    PANEL INDEX = SCAN CODE -> 102_PANEL_INDEX
                ENDIF
            ENDIF
        ENDIF
    ENDIF
    DO WHILE (ESCAPE KEY IS NOT PRESSED)
        IF (SELECTED KEYBOARD = AT)
            DISPLAY AN AT KEYBOARD LAYOUT PANEL (SPECIFIED
            BY PANEL INDEX)
        ELSE
            IF (SELECTED KEYBOARD = 101)
                DISPLAY A 101 KEYBOARD LAYOUT PANEL (SPECIFIED
                BY PANEL INDEX)
            ELSE (SELECTED KEYBOARD = 102)
                DISPLAY AN 102 KEYBOARD LAYOUT PANEL (SPECIFY
                BY PANEL INDEX)
            ENDIF
        ENDIF
        IF F7 KEY (BACKWARD) IS PRESSED
            IF (PANEL INDEX = 1)
                PANEL INDEX = LAST PANEL
            ELSE
                PANEL INDEX = PANEL INDEX - 1
            ENDIF
        ELSE
            IF F8 KEY (FORWARD) IS PRESSED
                IF (PANEL INDEX = LAST PANEL)
                    PANEL INDEX = 1
                ELSE
                    PANEL INDEX = PANEL INDEX + 1
                ENDIF
            ENDIF
        ENDIF
    ENDDO ENDPROC DISPLAY_LAYOUT
RKBREPLY MAIN PROC
    IF (INITIAL KEY SELECTION FLAG IS OFF)
        PRIOR KEY DEFINITION ARRAY = CURRENT KEY
        DEFINITION ARRAY
    ENDIF
    INITIALIZE SHIFT INDEX = 1
    DO UNTIL (SHIFT INDEX = 6) OR REMAP_RC = FATAL
        ERROR)
        INITIALIZE CURRENT DEFINITION ARRAY(SHIFT INDEX)
        SET POINTER TO CURRENT ENTRY OF XLAT TABLE
        BUFFER_INDEX_OF_DEFINITION = 1
        IF IT IS NOT A DEAD KEY
            IF IT IS A SINGLE CHARACTER KEY
                SAVE KEY DEFINITION IN EMULATOR FORMAT
                CALL REPLAY_CHARACTER
            ELSE
                IF IT IS A FUNCTION KEY
```

```
                    -continued
                SAVE KEY DEFINITION IN EMULATOR FORMAT
                CALL REPLY_FUNCTION
            ELSE
                IF IT IS A STRING KEY
                CALL REPLAY_STRING
                ENDIF
            ENDIF
        ENDIF
    ENDIF
    INCREASE SHIFT INDEX BY 1
ENDDO
IF REMAP_RC = OK
    IF (INITIAL KEY SELECTION FLAG IS ON)
    ASSIGN PRIOR KEY DEFINITION ARRAY ELEMENTS
    DISPLAY "CURRENT SELECTION" POP UP
    ELSE
        ASSIGN CURRENT KEY DEFINITION ARRAY ELEMENTS
        DISPLAY "CURRENT SELECTION" POP UP
        DISPLAY "PRIOR SELECTION" POP UP
    ENDIF
ENDIF ENDPROC RKBREPLY MAIN PROC
```

The RKBREPLY module is called by the RKBACTS module to process the current or the current/prior selected key pop-up panels. As noted above, these pop-up panels display all of the definitions associated with the selected key.

```
REPLAY_CHARACTER PROC
    CALL RKBASCPM TO CONVERT KEY DEFINITION TO
    DISPLAYABLE SINGLE CHARACTER
    IF CONVERT_RC IS NOT OK
        REMAP_RC = FATAL ERROR
    ELSE
        CURRENT DEFINITION ARRAY ELEMENT (STARTING FROM
        BUFFER_INDEX_OF_DEFINITION) = ASCII SINGLE
        CHARACTER
        UPDATE BUFFER_INDEX_OF_DEFINITION
    ENDIF ENDPROC REPLAY_CHARACTER
REPLAY_FUNCTION PROC
    CALL RKBFNCPM TO CONVERT KEY DEFINITION TO
    DISPLAYABLE FUNCTION NAME
    IF (CONVERT_RC IS NOT OK)
        REMAP_RC = FATAL ERROR
    ELSE
        CURRENT DEFINITION ARRAY ELEMENT(STARTING FROM
        BUFFER_INDEX_OF_DEFINITION) = BEGIN BRACKET +
        DISPLAYABLE FUNCTION NAME + END BRACKET
        UPDATE BUFFER_INDEX_OF_DEFINITION
    ENDIF ENDPROC REPLAY_FUNCTION
REPLAY_STRING PROC
    USE SCAN CODE AND SHIFT INDEX TO FIND THE MATCHED
    POINTER AND LENGTH IN THE STRING POINTER TABLE
    IF (NOT FOUND)
        REMAP_RC = FATAL ERROR
    ELSE
        SAVE POINTER IN THE MATCHED STRING POINTER TABLE
        ENTRY
        SET SEARCH_ENTRY_LENGTH = LENGTH OF STRING TABLE
        ENTRY
        SET SEARCH_MAX_NUMBER = LENGTH IN THE MATCHED
        STRING POINTER TABLE ENTRY
        SET SEARCH_INDEX = 0
        DO WHILE (REMAP_RC = OK) AND (SEARCH INDEX <
          SEARCH_MAX_NUMBER)
            SET CURRENT POINTER TO STRING TABLE
            SAVE KEY DEFINITION IN THE CURRENT STRING TABLE
            ENTRY
            IF (IT IS NOT A FUNCTION KEY)
                PUT " AS BEGIN STRING
                DO WHILE (IT IS NOT A STRING) AND
                  (SEARCH_INDEX < SEARCH_MAX_NUMBER)
                  AND (REMAP_RC IS OK)
                    CALL REPLAY_CHARACTER
                    IF (REMAP_RC IS OK)
                        IF (SINGLE CHARACTER = ")
                            CURRENT KEY DEFINITION ARRAY
                            ELEMENT (STARTING FROM
                            BUFFER_INDEX_OF_DEFINITION
                            UPDATE BUFFER_INDEX_OF_DEFINITION
                        ENDIF
                    ENDIF
                    INCREASE SEARCH_INDEX BY 1
```

```
            SET CURRENT POINTER TO STRING TABLE
            SAVE KEY DEFINITION IN THE CURRENT STRING
               TABLE ENTRY
            ENDIF
         ENDDO
         IF (REMAP_RC IS OK)
            IF (IT IS A FUNCTION KEY) OR (SEARCH_INDEX =
               SEARCH_MAX_NUMBER)
               PUT " AS END STRING
               NOTE: SEARCH INDEX IS NOT INCREASE BY 1
               HERE, THEREFORE IT WILL RETURN TO OUTERLOOP
               AND START AGAIN TO CATCH FUNCTION
            ENDIF
         ENDIF
      ELSE (IT IS A FUNCTION KEY)
         CALL REPLAY_FUNCTION
         IF (REMAP_RC IS NOT FATAL ERROR)
            INCREASE SEARCH INDEX BY 1
         ENDIF
      ENDIF
   ENDDO
ENDIF ENDPROC REPLAY_STRING
```

A RKBASCPM module is called from the RKBREPLY and RKBVIEW modules to convert a key definition (type, value, XLAT operation) into a displayable single character. This module is also called by the RKBREMAP module to convert a single character into the key definition. This module performs the following functions: obtains primary code page in profile header, loads ASCII table for chosen emulator, identifies a convert direction by a convert direction flag, converts a key definition to a single character by using the XLAT table when convert direction is "reply" and converts a single character to a key definition using the XLAT table when the convert direction is "remap".

```
RKBASCPM MAIN PROC
   IF (SELECTED EMULATOR = 3270)
      SET POINTER TO DIRECTORY TABLE = 3270 ASCII
         DIRECTORY TABLE
      SET MAX NUMBER OF DIRECTORY ENTRIES = 3270 ASCII
         DIRECTORY ENTRIES
   ELSE
      IF (EMULATOR = 3101)
         SET POINTER TO DIRECTORY TABLE = 3101 ASCII
            DIRECTORY TABLE
         SET MAX NUMBER OF DIRECTORY ENTRIES = 3101 ASCII
            DIRECTORY ENTRIES
      ELSE
         SET POINTER TO DIRECTORY TABLE = VT100 ASCII
            DIRECTORY TABLE
         SET MAX NUMBER OF DIRECTORY ENTRIES = VT100
            ASCII DIRECTORY ENTRIES
      ENDIF
   ENDIF
   IF (CONVERT DIRECTION IS REPLY)
      CALL ASCII_REPLY TO CONVERT A KEY DEFINITION INTO
         DISPLAYABLE ASCII
   ELSE (CONVERT DIRECTION IS REMAP)
      CALL ASCII_REMAP TO CONVERT A ASCII CHARACTER INTO
         KEY DEFINITION FORMAT
   ENDIF ENDPROC RKBASCPM
ASCII_REPLY PROC
   USE PRIMARY CODE PAGE TO SEARCH THE MATCHED POINTER
      AND NUMBER OF ENTRIES IN ASCII DIRECTORY TABLE
   IF (FOUND)
      POINTER TO ASCII TABLE = DIRECTORY.POINTER
         (PRIMARY CODE PAGE SECTION)
      MAX NUMBER OF ASCII ENTRIES = DIRECTORY.NUMBER OF
         ENTRIES
      USE KEY DEFINITION (TYPE, VALUE, XLAT OPERATION
         FORMAT) TO SEARCH THE MATCHED 850 ASCII IN
         PRIMARY SECTION OF ASCII TABLE
      IF (NOT FOUND)
         POINTER TO ASCII TABLE = DIRECTORY.POINTER
            (INVARIANT)
         MAX NUMBER OF ASCII ENTRIES = DIRECTORY.NUMBER
            OF ENTRIES (INVARIANT)
         USE KEY DEFINITION(TYPE, VALUE, XLAT OPERATION
            FORMAT) TO SEARCH THE MATCHED 850 ASCII IN
            INVARIANT SECTION OF ASCII TABLE
         IF (NOT FOUND)
            CONVERT_RC = ERROR
         ENDIF
```

```
            ENDIF
        ELSE
            CONVERT_RC = ERROR
        ENDIF
        IF (CONVERT_RC = OK)
            ASCII SINGLE CHARACTER =
                REPLY_XLATED_BUFFER(MATCHED 850 ASCII)
        ENDIF ENDPROC REPLY_ASCII
ASCII_REMAP PROC
    XLATED_CHARACTER = REMAP_XLAT_BUFFER(ASCII SINGLE
        CHARACTER)
    USE PRIMARY CODE PAGE TO SEARCH THE MATCHED POINTER
    AND NUMBER OF ENTRIES IN ASCII DIRECTORY TABLE
    IF (FOUND)
        POINTER TO ASCII TABLE = DIRECTORY.POINTER
            (PRIMARY CODE PAGE SECTION)
        MAX NUMBER OF ASCII ENTRIES = DIRECTORY.NUMBER OF
            ENTRIES
        USE XLATED_CHARACTER TO SEARCH THE MATCHED KEY
        DEFINITION (TYPE, VALUE AND XLAT OPERATION) IN
        PRIMARY SECTION OF ASCII TABLE
        IF (NOT FOUND)
            POINTER TO ASCII TABLE = DIRECTORY.POINTER
                (INVARIANT)
            MAX NUMBER OF ASCII ENTRIES = DIRECTORY.NUMBER
                OF ENTRIES (INVARIANT)
            USE XLATED_CHARACTER TO SEARCH THE MATCHED KEY
                DEFINITION (TYPE, VALUE, AND XLAT OPERATION)
                IN INVARIANT SECTION OF ASCII TABLE
            IF (NOT FOUND)
                CONVERT_RC = ERROR
            ENDIF
        ENDIF
    ELSE
        CONVERT_RC = ERROR
    ENDIF
    IF (CONVERT_RC = OK)
        KEY DEFINITION TO BE SAVED = THE MATCHED KEY
            DEFINITION IN ASCII TABLE
    ENDIF ENDPROC REMAP_ASCII
```

A RKBFNCPM module is called by the RKBREPLY and RKBVIEW modules to convert a key definition into a displayable function name. This module is also called by the RKBREMAP module to convert a function name into the key definition. THE RKBFNCPM module performs the following functions: loads function table for a chosen emulator, identifies a convert direction, converts a key definition to a function name when the convert direction is "reply" and converts a function name to a key definition when the convert direction is "remap".

```
RKBFNCPM MAIN PROC
    IF (SELECTED EMULATOR = 3270)
        SET POINTER TO FUNCTION TABLE = 3270 FUNCTION
            TABLE
        IF (CONVERT DIRECTION IS REPLY)
            MAX NUMBER OF FUNCTION ENTRIES = FUNCTION
                ENTRIES FOR 3270 ALL FUNCTIONS
        ELSE
            MAX NUMBER OF FUNCTION ENTRIES = FUNCTION
                ENTRIES FOR 3270 REMAPABLE FUNCTIONS ONLY
        ENDIF
    ELSE
        IF (SELECTED EMULATOR = 3101)
            SET POINTER TO FUNCTION TABLE = 3101 FUNCTION
                TABLE
            IF (CONVERT DIRECTION IS REPLY)
                MAX NUMBER OF FUNCTION ENTRIES = FUNCTION
                    ENTRIES FOR 3101 ALL FUNCTIONS
            ELSE
                MAX NUMBER OF FUNCTION ENTRIES = FUNCTION
                    ENTRIES OF 3101 REMAPABLE FUNCTIONS ONLY
            ENDIF
        ELSE (EMULATOR = VT100)
            SET POINTER TO FUNCTION TABLE = VT100 FUNCTION
                TABLE
            IF (CONVERT DIRECTION IS REPLY)
                MAX NUMBER OF FUNCTION ENTRIES = FUNCTION
                    ENTRIES FOR VT100 ALL FUNCTIONS
            ELSE
                MAX NUMBER OF FUNCTION ENTRIES = FUNCTION
                    ENTRIES OF VT100 REMAPABLE FUNCTIONS ONLY
```

```
            ENDIF
         ENDIF
      ENDIF
   ENDIF
   ISSUE DOSGETMESSAGE TO INSERT THE FUNCTION NAME FROM
      SYSTEM MESSAGE FILE INTO THE FUNCTION TABLE
   SET SEARCH_INDEX = 1
   SET SEARCH_MAX = MAX NUMBER OF FUNCTION ENTRIES
   IF (CONVERT DIRECTION IS REPLY)
      USE TYPE/VALUE OF KEY DEFINITION TO SEARCH THE
         MATCHED FUNCTION NAME IN FUNCTION TABLE
      IF (FOUND)
         SAVE THE FUNCTION NAME
      ENDIF
   ELSE (CONVERT DIRECTION IS REMAP)
      USE FUNCTION NAME TO SEARCH THE MATCHED KEY
         DEFINITION (TYPE, VALUE, XLAT OPERATION) IN
         FUNCTION TABLE
      IF (FOUND)
         SAVE THE KEY DEFINITION
      ENDIF
   ENDIF
   IF (NOT FOUND)
      CONVERT_RC = ERROR
   ENDIF ENDPROC RKBFNCPM
```

Figure 2:
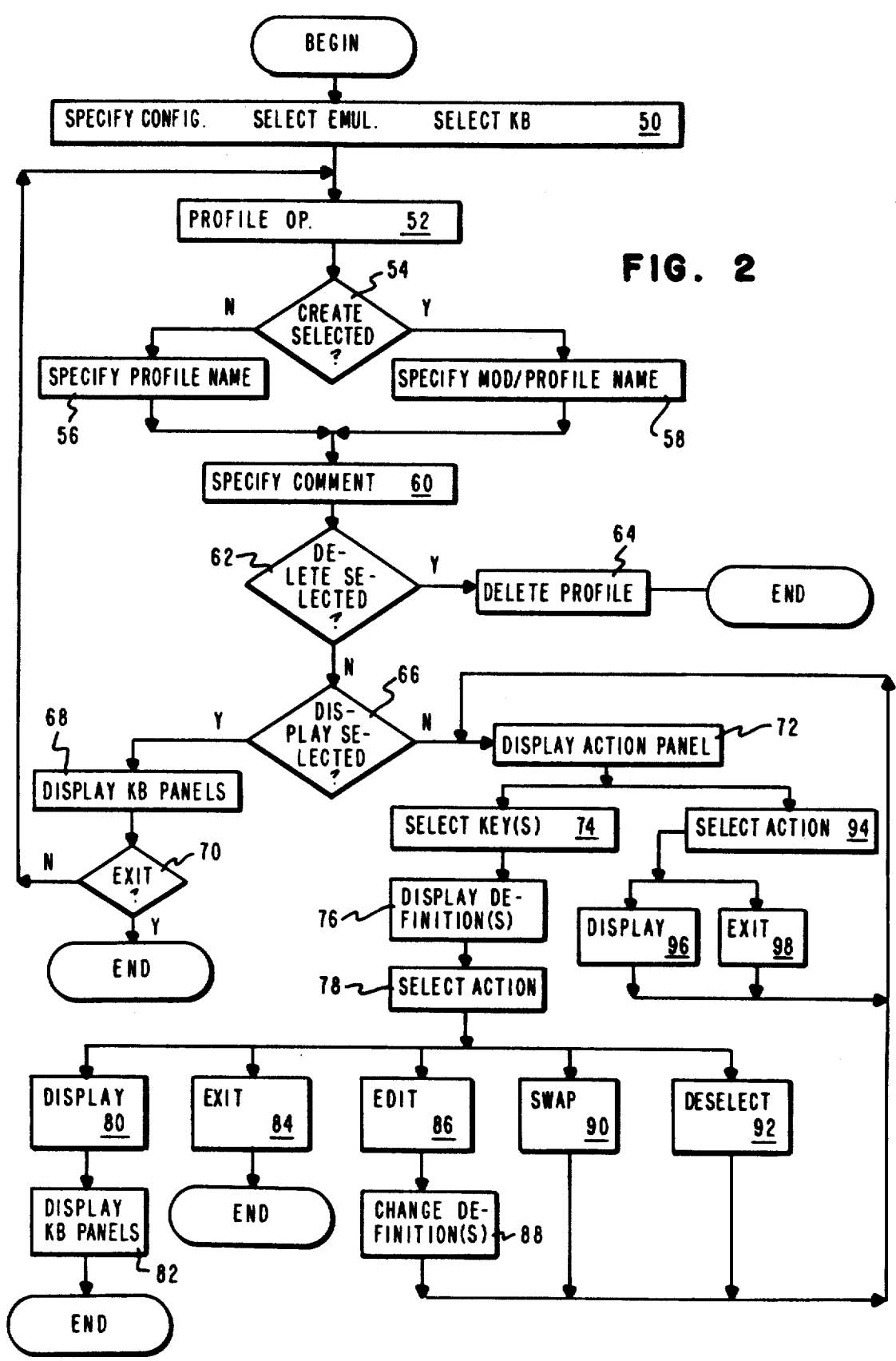
FIG. 2 is a flow diagram illustrating the detailed steps of the method of the present invention.

Referring to FIG. 2, there is shown a flow diagram of the keyboard function program. After the keyboard program has been activated by the user, the system 10 prompts the user to enter the name of a configuration file in step 50. The program will present the user with a default configuration file which is the current file in use. The user may enter a different file other than the one presented. The user also enters the emulator for which the remap keyboard is to be used and selects the physical keyboard on which the remapping is to be used. The user in step 52 selects one of a plurality of profile operations to be performed on the keyboard profile. The types of operations include display, create, change and delete. In step 58, the system 10 determines whether the create operation was selected in step 52. If the create operation was not selected in step 52, the user has selected the change, delete or the display operation. Step 56 prompts the user to provide the name of an existing keyboard profile upon which the selected profile operation will act.

If the user selected the create operation in step 52, the user, in step 58, is prompted to enter an existing model profile name and a new profile name under which the newly created keyboard will be saved. The user in step 60 may enter any comment text which will be stored with the designated profile name. In step 62, a determination is made whether the delete operation was selected.

If the delete operation was selected, the designated keyboard profile is deleted from memory 16 in step 64.

Step 66 determines whether the display operation was selected which facilitates the display of a plurality of keyboard panels in step 68. The user may exit the display profile in step 70. Otherwise, control is transferred to step 52 to facilitate the selection of another profile operation. If the display profile operation was not selected, an action panel is displayed to the user in step 72. The user may select one of plurality of keys represented by blots on the action panel in step 74. System 10 then displays all of the definitions for the selected key in step 76. The user can then select another key or as in step 78 select one of a plurality of actions to be preformed on the selected key or keys. The plurality of actions include edit, swap, deselect, display and exit. If the edit action is selected, a edit pop-up panel is presented to the user in step 86 to facilitate the change of one or more of the existing definitions for the selected key in step 88. If the swap action is selected, the user would have previously selected two keys. The definitions for the selected keys are exchanged in step 90. If the deselect action is selected, the user has previously selected one or more keys and has decided to select a different key or keys. Step 92 eliminates the previous selected key or keys. In step 80, the display action enables the user to keep a running account of the changes made to the definitions of the selected keys. Step 82, which is similar to step 68, displays a plurality of keyboard panels associated with predetermined sections of the selected keyboard. In step 84, the user has selected the exit action. System 10 prompts to user to indicate whether he wants to save the modified keyboard profile prior to exiting the program, exit without saving the modified keyboard profile, save the keyboard profile then continue with the program, or continue without saving the keyboard profile.

In step 72, the user selects an action from the action panel. If the display action is selected, the system 10 in step 96 displays a plurality of keyboard panels associated with predetermined sections of the selected keyboard. The panels are arranged in a predetermined order and will be displayed with first panel in the predetermined order being displayed first. Thereafter, control is transferred to step 72. The user may also select an exit action in step 98 which transfers control to step 72.

Figure 4:
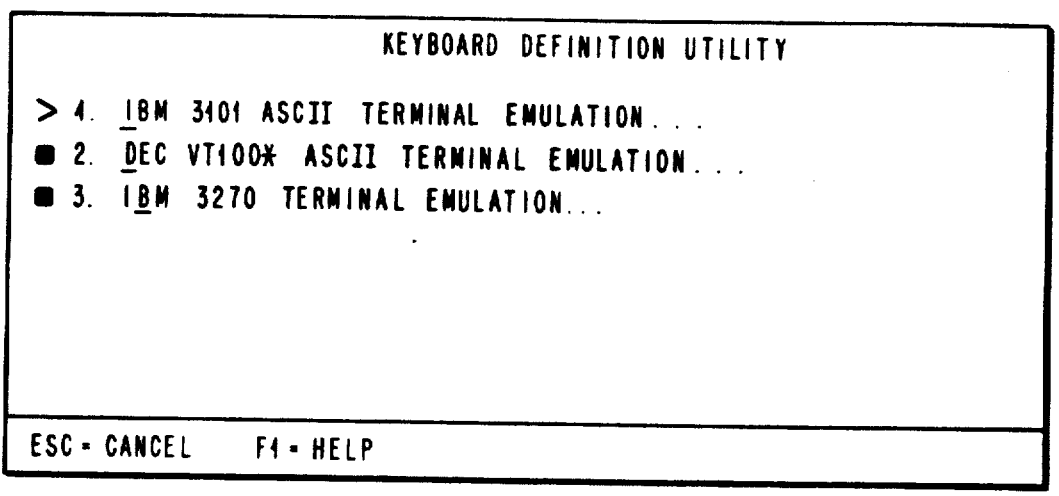
Figure 8:
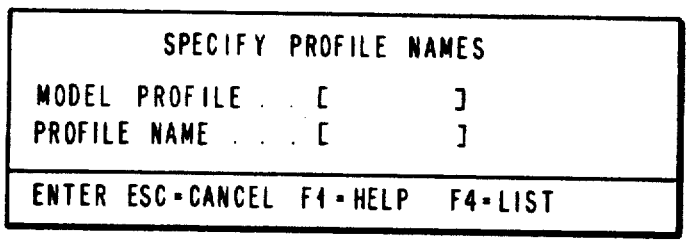
Figure 10:
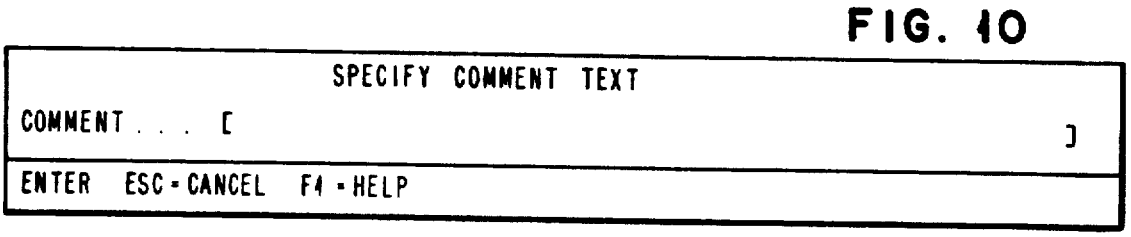

Referring to FIGS. 3 through 19, there is shown a configuration file name specification panel, FIG. 3, which includes a default configuration file name supplied by the system 10. The user either agrees with the default name displayed by the system 10 or enters another configuration file name. System 10 then displays a keyboard definition utility panel shown in FIG. 4 whereby the user is prompted to select one of a plurality of emulators listed therein. In a keyboard type panel shown in FIG. 5, the user must select one of the physical keyboards listed therein. FIG. 6 shows a panel wherein the user selects one of a plurality of profile operations to be performed. Once the profile operation has been selected, the exact operations which follow depend on the which profile operation was selected. If a change, delete or display operation was selected, the user must enter a profile name in a profile name panel shown in FIG. 7. If a create operation was selected, the user must specify an existing model profile name and a new profile name in the panel shown in FIG. 8. The user may request that system 10 display a list of existing model profiles names by selecting an associated function key on the keyboard 22 (FIG. 1) shown in the specify profile names panel shown in FIG. 8. FIG. 9 displays a select profile name panel which is a list of existing model profile names among which the user may select any one thereof. A typical entry in the select profile name panel is "3EUS" for the model profile name and "IBM Enhanced Keyboard layout United States" appearing in the comment field for the above-identified model profile name. FIG. 10 allows the user to enter any comments desired in a comments panel. FIG. 11 shows an action or keyboard layout panel which displays a layout of the selected physical keyboard. The user then selects one of the keys and the system 10 responds with the pop-up panel shown in FIG. 12 which shows the current definitions for the selected key. If the user selects a second key, system 10 will also display a second pop-up shown in FIG. 13 while displaying the pop-up panel of FIG. 12. Thus, the current selected key definitions and the prior or immediately previous selected key definitions will continue to be displayed. If the user was to perform an action on the selected key or keys, the user must select one of the actions listed on the action bar shown at the top of the action panel (FIG. 11). If the exit function is selected, the user must select one of the operations listed in FIG. 14. FIG. 15 shows all of the definitions of the selected key if the edit function is selected. In order to modify the displayed definitions, the user types over any of the definitions. The swap function panel shown in FIG. 16 enables the swapping of the definitions of two selected keys. The deselect function panel, shown in FIG. 17, allows the user to erase the pop-up panel for any previously selected key and enables the user to select a new key. If the user selects the display function, FIG. 18, the system 10 displays a plurality of keyboard panels, one of which is shown in FIG. 19, associated with respective sections of the selected keyboard. The keyboard panels will be displayed one at a time in a rotating manner. The keyboard panel which includes the last selected key will be displayed first.

In summary, a unique method of and system for, remapping a keyboard within a computer system in a user friendly manner. The user activates the keyboard remap program and then selects the type of keyboard layout to be remapped. The user is then prompted to select one of a plurality of operations to be performed on the selected keyboard. The operations include create a new keyboard, change, display or delete an existing keyboard. If the selected operations is create or change, the user is presented with a display- of a layout of the selected keyboard. Thereafter, the user selects one or more keys to be remapped and selects an action to be performed on the selected key or keys. The ..available actions include swap, edit, deselect, display or exit. In order to change one or more of the definitions for a selected key, the user selects either the edit or the swap function. The definitions may be a single character, a string of characters or a function. The user may then simultaneously view the definitions of a plurality of keys within a selected one of a plurality of sections of the selected keyboard. After the user has performed the desired actions on the selected keyboard, the user may store the modified keyboard and exit the remap program or perform other operations which are available in the remap program.

While the invention has been particularly shown and described with reference to a preferred embodiment, it will be understood by those skilled in the art that various changes in form and detail may be made without departing from the spirit and scope of the invention.

We claim:

1. A method of remapping definitions of keys of one of a plurality of keyboard types to be used in a computer system with one of a plurality of computer terminal emulators, comprising:

choosing a particular one of said plurality of keyboard types, irrespective of whether said particularly one of said keyboard types is connected to said system, and a particular one of said plurality of computer terminal emulators with which said particular one of said plurality of keyboard types is to be used;

displaying, on a display screen of said computer system, a representation of a first portion of a key layout of any said particular one of said plurality of keyboard types;

altering the appearance of at least a first element of said representation, said first element representing a first key of said particular one of said plurality of keyboard types;

displaying, on said display screen, a listing of one or more present definitions of said first key;

modifying at least one of said one or more definitions of said first key; and updating a profile file associating said particular one of said keyboard types and said particular one of said terminal emulators with said one or more definitions of said first key after said modifying.

2. The method of claim 1 further comprising:

altering the appearance of a second element of said representation, said second element representing a second key of said particular one of said plurality of keyboard types; and displaying, on said display screen, a listing of one or more present definitions of said second key.

3. The method of claim 2 further comprising:

exchanging definitions of said first and second keys after displaying said listings of present definitions and prior to updating said profile file.

4. The method of claim 1 wherein said steps of displaying are performed concurrently.

5. The method of claim 1 further comprising:

displaying, on said display screen, a representation of keys of a second portion of said keyboard.

6. The method of claim 5 further comprising:

displaying, on said representation of keys, one or more definitions of each of said keys of said second portion.

7. The method of claim 6 wherein said second portion includes said first key.

8. A method of remapping definitions of keys of one of a plurality of keyboard types to be used in a computer system with one of a plurality of computer terminal emulators, comprising:

choosing a particular one of said plurality of keyboard types, irrespective of whether said particular one of said keyboard types is connected to said system, and a particular one of said plurality of computer terminal emulators with which said particular one of said plurality of keyboard types is to be used;

creating a new profile file that links said particular one of said plurality of keyboard types to said particular terminal emulator;

displaying, on a display screen of said computer system, a representation of a first portion of a key layout of any said particular one of said plurality of keyboard types;

altering the appearance of at least a first element of said representation, said first element representing a first key of said particular one of said plurality of keyboard types;

displaying, on said display screen, a listing of one or more present definitions of said first key;

modifying at least one of said one or more definitions of said first key; and updating said profile file with said one or more definitions of said first key after said modifying.

9. The method of claim 8 wherein said step of creating a new profile file further comprises:

copying and renaming an existing profile file; and editing the renamed profile file as said new profile file.

10. A computer means for remapping definitions of keys of one of a plurality of keyboard types to be used in a computer system with one of a plurality of computer terminal emulators, comprising:

means for choosing a particular one of said plurality of keyboard types, irrespective of whether said particular one of said keyboard types is connected to said system, and a particular one of said plurality of computer terminal emulators with which said particular one of said plurality of keyboard types is to be used;

means for displaying, on a display screen of said computer system, a representation of a first portion of a key layout of any said particular one of said plurality of keyboard types;

means for altering the appearance of at least a first element of said representation, said first element representing a first key of said particular one of said plurality of keyboard types;

means for displaying, on said display screen, a listing of one or more present definitions of said first key;

means for modifying at least one of said one or more definitions of said first key; and means for updating a profile file associating said particular one of said keyboard types and said particular one of said terminal emulators with said one or more definitions of said first key after said modifying.

11. The computer means of claim 10 further comprising:

means for altering the appearance of a second element of said representation, said second element representing a second key of said particular one of said plurality of keyboard types; and means for displaying, on said display screen, a listing of one or more present definitions of said second key.

12. The computer means of claim 11 further comprising:

means for exchanging definitions of said first and second keys after displaying said listings of present definitions and prior to updating said profile file.

13. The computer means of claim 10 wherein said means for displaying are operated concurrently.

14. The computer means of claim 10 further comprising:

means for displaying, on said display screen, a representation of keys of a second portion of said keyboard.

15. The computer means of claim 14 further comprising:

means for displaying, on said representation of keys, one or more definitions of each of said keys of said second portion.

16. The computer means of claim 15 wherein said second portion includes said first key.

17. A computer means of remapping definitions of keys of one of a plurality of keyboard types to be used in a computer system with one of a plurality of computer terminal emulators, comprising:

means for choosing a particular one of said plurality of keyboard types, irrespective of whether said particular one of said keyboard types is connected to said system, and a particular one of said plurality of computer terminal emulators with which said particular one of said plurality of keyboard types is to be used;

means for creating a new profile file that links said particular one of said plurality of keyboard types of said particular terminal emulator;

means for displaying, on a display screen of said computer systems, a representation of a first portion of a key layout of any said particular one of said plurality of keyboard types;

means for altering the appearance of at least a first element of said representation, said first element representing a first key of said particular one of said plurality of keyboard types;

means for displaying, on said display screen, a listing of one or more present definitions of said first key;

means for modifying at least one of said one or more definitions of said first key; and means for updating said profile file with said one or more definitions of said first key after said modifying.

18. The computer means of claim 17 wherein said means for creating a new profile file further comprises:

means for copying and renaming an existing profile file; and means for editing the renamed profile file as said new profile file.

* * * * *

UNITED STATES PATENT AND TRADEMARK OFFICE
CERTIFICATE OF CORRECTION

PATENT NO.  : 5,086,503

DATED       : February 4, 1992

INVENTOR(S) : Connie Y. Chung, Robert G. Keen, Ozella Raymond, Jan W. Snyder,
              Dennis A. Tohlen, Duane D. Heerema, David R. Limpert and Scott
              Makinen It is certified that error appears in the above-identified patent and that said Letters Patent is hereby corrected as shown below:

On the title page, Item [75]: "Inventors:", please insert after "all of Tex.", --Duane D. Heerema; David R. Limpert, both of Rochester, Minn.; Scott Makinen of Fort Collins, Col.--;

Col. 4, line 66, please delete "CALL SPECIFY_MODEL_NEW PROFILE" and substitute therefor --CALL SPECIFY_MODEL_NEW_PROFILE--;

Col. 5, line 5, please delete "SPECIFY_MODEL_NEW PROFILE" and substitute therefor --SPECIFY_MODEL_NEW_PROFILE--;

Col. 24, line 35, please delete "types of" and substitute therefor --types to--; and Col. 24, line 38, please delete "systems" and substitute therefor --system--.

Signed and Sealed this

Twelfth Day of October, 1993

Attest:

BRUCE LEHMAN

*Attesting Officer*    Commissioner of Patents and Trademarks